United States Patent [19]
Trotter

[11] Patent Number: 5,870,751
[45] Date of Patent: *Feb. 9, 1999

[54] DATABASE ARRANGED AS A SEMANTIC NETWORK

[75] Inventor: Martin John Trotter, Romsey, United Kingdom

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 665,140

[22] Filed: Jun. 14, 1996

[30] Foreign Application Priority Data

Jun. 19, 1995 [GB] United Kingdom ............... 9512453

[51] Int. Cl.$^6$ ........................................ G06F 17/30
[52] U.S. Cl. ................... 707/102; 707/103; 707/105; 707/5
[58] Field of Search ............................ 707/102, 103, 707/5, 104

[56] References Cited

U.S. PATENT DOCUMENTS

| | | | |
|---|---|---|---|
| 4,815,005 | 3/1989 | Oyanagi et al. | 364/513 |
| 4,822,283 | 4/1989 | Roberts | 434/171 |
| 4,914,590 | 4/1990 | Loatman et al. | 364/419 |
| 5,193,185 | 3/1993 | Lanter | 707/102 |
| 5,208,899 | 5/1993 | Wheeler et al. | 395/62 |
| 5,276,885 | 1/1994 | Milnes et al. | 395/700 |
| 5,353,371 | 10/1994 | Honiden et al. | 395/1 |
| 5,625,814 | 4/1997 | Luciw | 707/5 |
| 5,630,125 | 5/1997 | Zellweger | 707/104 |

*Primary Examiner*—Thomas G. Black
*Assistant Examiner*—Frantz Coby
*Attorney, Agent, or Firm*—Jeanine S. Ray-Yarletts

[57] ABSTRACT

A semantic network is described in which data is stored in data storage areas at nodes of the network, there being a root node from which all other nodes depend, in a branched structure, and in which data stored at each node includes relationship information about related nodes other than nodes linked by a branch from said node. The relationship information includes a token identifying the type of relationship. The other node in a relationship may be a virtual node, which does not actually exist, but whose data content is stored within the relationship information.

18 Claims, 3 Drawing Sheets

DATABASE ARRANGED AS A SEMANTIC NETWORK

TECHNICAL FIELD

The present invention relates to the field of data processing, and more particularly to the representation of interrelationships between data and to the storage of the data itself by the use of a semantic network.

BACKGROUND ART

Conceptual data modelling is used to capture descriptions of objects and their behaviour in the real world and to find structured representations for them in a database. Many different data models have been proposed since the early 1960's. A data model is a tool for designing a database. A data model includes a set of rules to describe the structure and meaning of data in the database and the operations which may be performed on the data.

Classical data models used for database design generally fall into three categories; hierarchical, network and relational data models. Examples of the three categories are IBM's IMS (hierarchical), Honeywell's IDS (network) and IBM's DB2 (relational). Hierarchical and network models incorporate the concept of records as a collection of named fields to represent each individual data subject. The hierarchical model additionally allows a tree-like set of one-to-many relationships in which each record occurs at a single specified level of the hierarchy. The relational model accommodates only record types and not explicit links between data subjects. All three of these classical data models fail to capture much of the semantics associated with the data. The fundamental construct, the record, does not constitute an atomic semantic unit. Additional constraints are necessary to maintain the semantic integrity of the database, for example, ensuring that a subject identified by name in a relation or record really does exists in the database.

As a result of the deficiencies in classical data models when they are used for conceptual data modelling, there have been many proposals for semantic data models. In semantic data models, information is modelled in terms of atomic units called entities or objects. These can be defined as things that exist and are distinguishable, that is the type and name are associated in the entity or object. Examples are "employee named John Smith" or "company named Amalgamated Foods". Object-Oriented Databases—A Semantic Data Model Approach, Peter M. D. Gray, Krishnarao G. Kulkarni, Norman W. Paton, published by Prentice Hall, 1992, describes conceptual data modelling, classic data models and their deficiencies and semantic data models.

One of the semantic data models which has been used for modelling is a semantic network model. The basic structure of a semantic network model consists of nodes and arcs forming a network. The nodes represent data items or subjects, such as John Smith and Amalgamated Foods mentioned above. The arcs represent relationships such as "is employed by" and "employs". The subjects often have many interrelationships which are possible between them, but few that are actually followed.

"FIG. 1 shows a prior art semantic network 100 in schematic form. The network has a "roof" node 102, which is created when the network is created. A node is a data item or subject, which is represented by data stored in an area of computer memory. Further nodes are shown at 104 and 106. These nodes are crated after the network (including the root node) has been created. Such nodes can only be created by identifying a container subject and then simultaneously creating the node together with a relationship to the container subject. So each node, on its creation, has a relationship, which is a relationship to its container subject. This relationship is stored at the node in the same way as any other relationship. For nodes 104 and 106, the container subject is the root node 102. The path from each node to its container subject is depicted in FIG. 1 by the solid lines 130–144. Although FIG. 1 shows a semantic network in which each container subject has a line to two child subjects, the number of child subjects may be any integer number. These lines are an acyclic containment graph. A subject which is a container subject for another subject cannot be deleted before all of the subjects for which it is a container subject have been deleted. This is achieved by the setting of a flag associated with the relationship between the container subject and the contained subject to indicate that the container subject cannot be deleted. Each subject is joined by a sequence of lines to all the other subjects. Hence there will always be a path from the root subject, represented by the root node, to all other subjects in the network.

Superimposed on this graph is a cyclic graph representing relationships between arbitrary pairs of subjects. Such relationships are illustrated by broken lines 150, 152. These indicate a relationship of one subject to another subject. These relationships can be between any of the subjects contained in the network. The relationship may be between a subject and its container, or even between a subject and the root node.

A relationship is an association between subjects. Examples of the types of relationships include "is managed by", "is manager of", "is employed by", and "is an employee of"."

IBM Technical Disclosure Bulletin, Vol.34, No.5, October 1991, p.412 discloses a technique for implementing "Has-Member" relationships as one-way relationships which takes advantage of the fact that many of the potential relationships are never actually followed. It uses this fact to reduce the storage space required.

J. Mylopoulos, P. A. Bernstein & H. K. T. Wong in "A language facility for designing database intensive applications," ACM Transactions on Database Systems 5 185-4307, 1980 discloses the TAXIS programming language as an example of a semantic network for data and procedure modelling.

GB Patent Application 2187 580 discloses linked pages of three types, primary, secondary and tertiary. Primary links link a page to a parent or child in a logically preceding or succeeding level. Secondary links link frames of a page serially. Tertiary links link one page to another page anywhere within the structure. All tertiary links are of the same form.

Many prior implementations of semantic networks have been very complex and inefficient in terms of storage usage. Thus they have been little used. An example of the complexity introduced is the storage of considerable amounts of information, with a subject (a data item) at one end of a relationship, concerning the subject at the other end of a relationship. Whilst this may obviate the need to query the subject at the other end of the relationship in order to obtain information from it, it introduces complexity into each subject.

So it would be advantageous to provide an efficient implementation of a semantic network, suitable for use with commonly available programming languages such as C and C++.

SUMMARY OF INVENTION

Accordingly the invention provides a database arranged as a semantic network in which data is stored in data storage areas at nodes of the network. The database representation is stored in a persistent computer memory an example of which is represented in FIG. 5.

FIG. 5 represents a computer 501, having an input means and an output means, upon which the present invention is implemented. It necessarily includes a central processing unit (CPU) 402 and a memory 503. The database 505 is arranged within a portion of the memory.

In the preferred embodiment of the database arranged as a semantic network, there is a root node from which all other nodes depend in a branched structure, and in which data stored in data storage areas at a first node includes relationship information about one or more relationships from the first node to one or more second related nodes, said second nodes not being linked in the branch structure to said first node. The semantic network has a branch structure to form the network and allow navigation around it, but additionally nodes include relationship information about relationships to other nodes to which they are not related in the branch structure.

Preferably, the relationship information stored at the nodes about relationships to other nodes includes a token identifying the type of relationship. The token can be easily stored in a small amount of storage, preferably two bytes, which is far more efficient in storage than storing the relationship name itself with the relationship. Amounts of storage other than two bytes may be used with corresponding changes in the number of relationship names supported. Storing the name itself generally requires a byte of storage per character of the relationship name and so, for example, the storage of "HasMember" as a relationship name will require ten bytes of memory, including a terminating byte. By using a token, two bytes are required, the translation to a relationship name preferably being by information contained in the database relating tokens to corresponding relationship names. In another embodiment, the information relating tokens to corresponding relationship names is not stored in the database, but is commonly available to multiple databases, that is only a single copy is kept for multiple semantic networks.

In a preferred embodiment, branches of the branched structure comprise a relationship, the relationship having flags indicating that the relationship is part of the branched structure. The flags may also indicate other data concerning the relationship, such as the type of the related subject or that the relationship points in a direction towards this node from a related node.

In another aspect of the present invention, the relationship information may relate to a "virtual" node, in which the relationship information itself includes the data which would have been in the virtual node. The data for the virtual node may also be stored at a location pointed to by the relationship information, the location not being part of the branched structure. The use of a token to identify the type of the relationship reduces the amount of data needed to be stored about a "virtual" node.

BRIEF DESCRIPTION OF DRAWINGS

An embodiment of the invention will now be described, by way of example, with reference to the accompanying drawings, in which.

DETAILED DESCRIPTION OF THE INVENTION

In the preferred embodiment, the semantic network is used to store details of subjects. A subject is an entry in a database containing, for example, information relating to resources in a data processing system. The relationships may include, for example, "is located on" for files and systems subjects, whose details are stored in the semantic network. To access the stored information, the subject which it is desired to obtain information about is first located. This is done by navigating the semantic network, traversing the acyclic containment relationships from the root node, to locate the desired subject. Once the subject is found, then within each subject is stored the data for the subject as well as information as to what relationships the subject has to other related subjects and the identity of those other related subjects. Should more information about a related subject be required, then a pointer to the related subject which is stored in this subject is used to move to the data for the related subject. In this way, it is possible to navigate around the semantic network. In the example given above, it is possible to find out information on the file which has been located, including for example which Direct Access Storage Drive (DASD) it is stored on, or which system the file is located on. Further information about the DASD is not available at this node, but the relationship from the file to the DASD can be traversed to move to the DASD to find more information about it. For example, those relationships may include information listing all the files stored on that DASD. Using that relationship information, the relationship from the DASD to another file may be traversed.

The semantic network of the preferred embodiment consists of an area of permanent storage divided up into a header and parcels of memory. The permanent storage may be non-volatile storage if it is desired to retain the information stored in the semantic network, or it may be volatile storage if it is not required to retain the information. The header defines information which is required for the network as a whole. The header will be described later with reference to Example 1. The parcels correspond to either a node 102, 104,106 in the semantic network of FIG. 1 (subject descriptor parcels, described later with reference to Example 3), or to a descriptor for the relationship 150,152 used in the semantic network of FIG. 1 (relationship descriptor parcels—described later with reference to Example 2). Data (subjects or relationships) to be stored is assigned to the parcels. A parcel is a contiguous set of bytes of memory with a two byte length descriptor as a prefix. The parcels corresponding to nodes may also have extension parcels which are used to store information which overflows from the subject parcel. These parcels are described later with reference to Examples 4 and 5.

Figure 1:
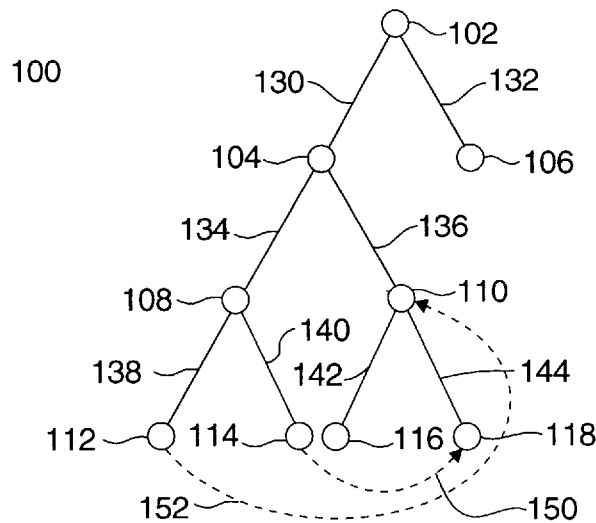
FIG. 1 is a schematic drawing of a prior art semantic net.
Figure 2:
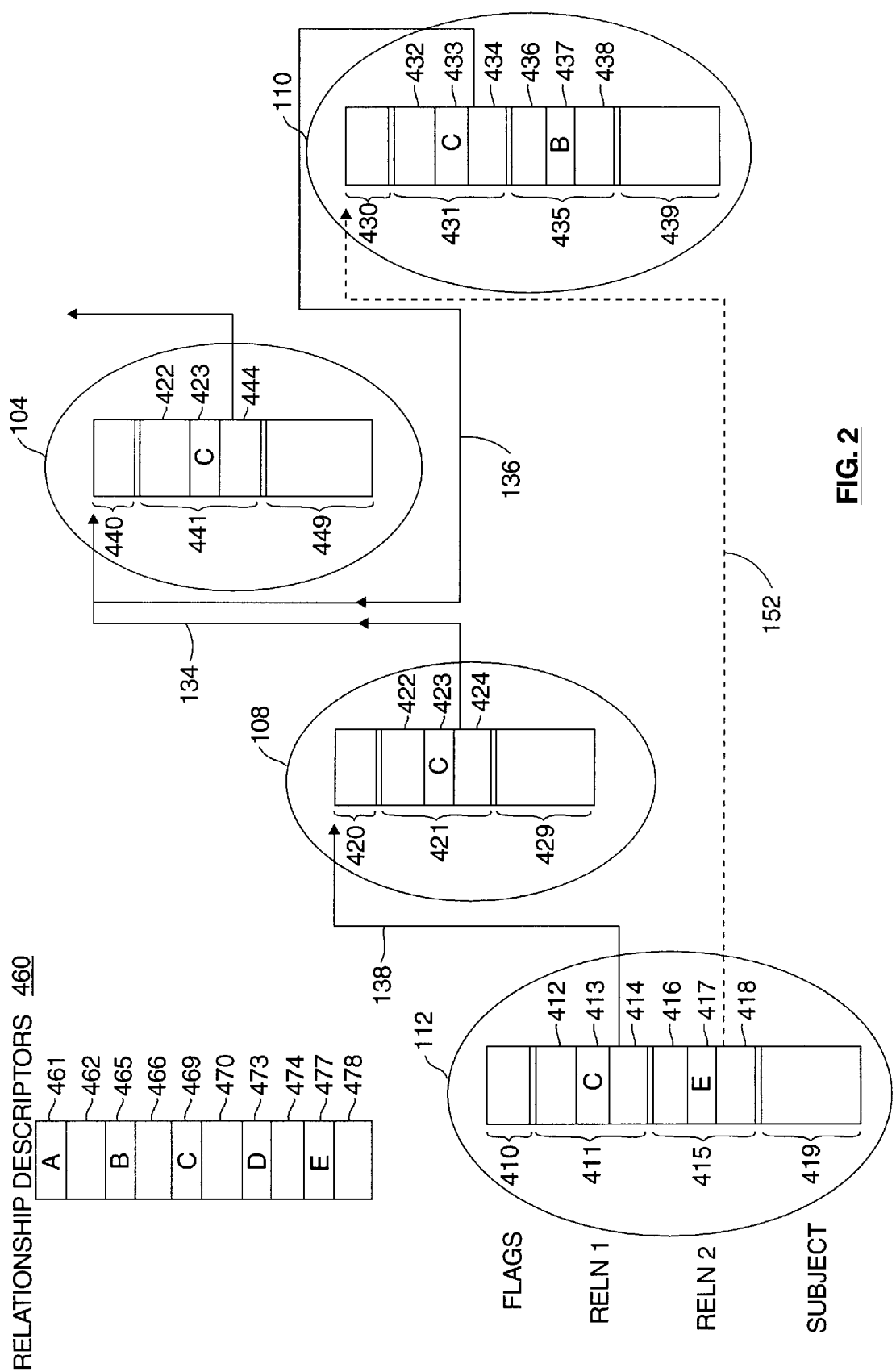
FIG. 2 is a block diagram of part of a semantic network implemented according to the present invention.
Figure 5:
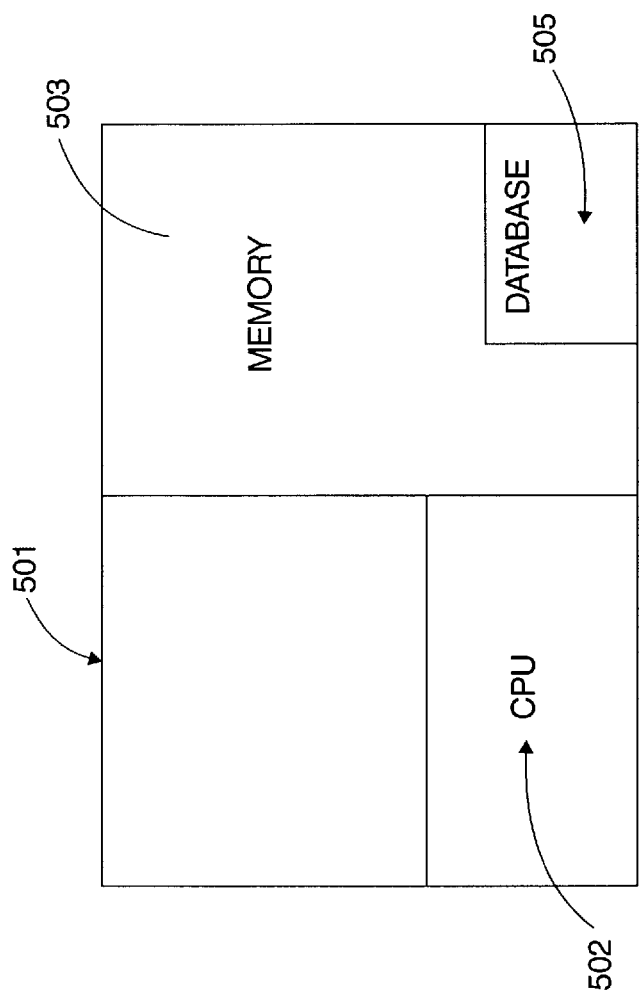
FIG. 5 is a block diagram of the system upon which the present invention could be implemented.

FIG. 2 shows a part of an embodiment of a semantic network implemented according to the present invention. The oval shapes 104,108,110,112 correspond to the respectively numbered nodes of the prior art semantic network of FIG. 1. The pointers 134,136,138 correspond to the respectively numbered lines of FIG. 1 which are used as part of the acyclic containment graph. The pointer 152 corresponds to the same numbered line in FIG. 1 used to represent a relationship between nodes. Nodes, lines and pointers shown in FIG. 1 and not shown in FIG. 2 have been omitted for clarity only and are present in the structure of the embodiment of FIG. 2, although not shown in FIG. 2 itself. The terms node and subject are interchangeable, the term node being used when referring to the item connected by lines as part of a network, the term subject being used when referring to the item as a data item.

Referring now to node 112, the information at this node has four portions 410,411,415,419. The first portion 410 is a set of flags for the node itself indicating whether the node itself is an integer, a float, a string or a sequence, whether this node is a container node for another node (which node 112 is not), whether the node is locked by a process against changes by all other processes and whether the node has been deleted. The flags are referred to in Example 3 as "sflags".

The second portion 411 is the first relationship currently present at this node. This portion 411 is split into three parts, the first part 412 being a set of flags associated with the relationship. The flags 412 have the same meaning as the flags 410 above, but applied to the relationship, not to the subject. The flags are referred to in Example 3 as "rflags". The second part 413 is a token used to describe the type of the relationship. The token stored at 413 is identified as "C". This relationship is the relationship created when the subject was created, in order to identify its container subject and so the relationship is marked as such in the flags 412 for the relationship. In FIG. 2, the relationship token "C" is used to identify that it is a container relationship. The container relationship need not be a special type of relationship. Each subject may have a different token, and hence a different type of relationship, used for the relationship to its container subject. All that is required is that it was the relationship created when the node was created and that it is marked as being the container relationship. The third part 414 is a pointer to the related subject. In FIG. 2, this is node 108, which is the container subject.

The third portion 415 is a relationship to another subject 110. This is also split into three parts 416,417,418 in the same way as second portion 411. This relationship differs in that it is of the type represented by token "E". This relationship is not marked as a container relationship.

The fourth portion 419 is the value of the subject itself. The flags 410 indicate the type of the subject, integer, float, string or sequence, that is how the bytes of data should be interpreted.

Referring now to node 108, the differences between node 108 and node 112 will be described. The value of the subject stored at 429 and the type of the subject stored in the flags 420 may be the same or may differ. The flags 420 at subject 108 indicate that subject 108 is a container subject and cannot be deleted until all of the subjects it contains have been deleted. The relationship 421 may be the same type as that stored in subject 112 or it may be different in type. Relationship 421 points towards subject 104.

Referring to node 110, the differences between node 110 and node 112 will be described. The value of the subject stored at 439 and the type of the subject stored in the flags 430 may be the same or may differ. The flags 430 at subject 110 indicate that subject 110 is a container subject and cannot be deleted until all of the subjects it contains have been deleted. The relationship 431 may be the same type as that stored in subject 112 or it may be different in type. Relationship 431 points towards subject 104. Relationship 435 is to what is called a "virtual subject", that is one in which the relationship is unidirectional towards the related subject and the related subject (its value) is contained within the relationship itself. A bit in the flags 436 is used to indicate this. The token 437 is used to indicate the relationship type in the same way as for any other relationship. The token used here is "B", but it could be "C" or "E" or any other valid token if the relationship corresponded to another valid token. Instead of a pointer at 438, what is stored is the actual value of the subject. This is integer, float, string or subject, according to what is contained in the relationship flags 436. The subject to which relationship 435 points does not correspond to a node in the prior art semantic network of FIG. 1 because the prior art network does not support such virtual subjects.

The tokens 413,417,423,433,437,443 are used to represent a type of relationship. In FIG. 2, tokens of "B", "C" and "E" are used to describe three types of relationship. Relationship descriptors 460 are used to look up what type of relationship a token corresponds to. For example, a token of "B" corresponds to a relationship descriptor at 465,466 where a token of "B" is found at 465 and the corresponding relationship name is found at 466.

The implementation of the semantic network according to the present invention, illustrated in FIG. 2 will now be described in detail, by means of describing the data structures built up in memory corresponding to the structures described above. First to be described is a header for the semantic network as a whole, followed by a parcel used as a relationship descriptor, then a subject descriptor parcel and finally extension parcels for subjects and for relationships.

Header

EXAMPLE 1

```
/* describe the header record of the database */
typedef struct {
    char    eyec[8];      /* SEMNET                      */
    int     size;         /* total bytes in memory segment */
    int     nfree;        /* total free bytes            */
    int     nrel_name;    /* total relationship names    */
    int     nsubj;        /* total subjects              */
    int     nreln;        /* total half relationships    */
    int     pcat;         /* prime category offset       */
    int     relnhead;     /* head of relation list       */
    int     relntail;     /* tail of relation list       */
    int     relntree;     /* tree to find names quickly  */
    int     freehead;     /* head of free list           */
    int     freeblok;     /* current block to alloc from */
    int     ncomit;       /* number of commits so far    */
    int     lockid;       /* who has it locked ?         */
} semnet;
```

Example 1 shows the structure in memory of a header for a semantic network implemented in accordance with the present invention.

"eyec" is the identifier or name used for this release of a semantic network. This may be used, for example, by a browser of the semantic network to determine that the structure in memory is indeed a semantic network and also what version number the semantic network is.

"size" is the total number of bytes which this semantic network has been allocated in memory. The memory used may be a shared memory segment of random access memory or it may be a file stored on non-volatile storage. The file is managed by a file manager, which is part of an operating system. In the preferred embodiment, the UNIX operating system is used (UNIX is a registered trademark in the United States and other countries licensed exclusively by X/Open Company Limited). "nfree" is the number of free bytes, within the total number of bytes defined by "size", within the memory segment or file which is free. On initialization of the semantic network, all of the bytes of memory are placed in parcels, but the parcels may contain bytes, all of which are free, or they may contain information about subjects or relationships.

"nrel_name" is the number of relationship names which exists in this semantic network. Examples of relationship names are "is employed by" and "is father of". Each of these relationships names are defined by the contents of a relationship descriptor parcel (see Example 2). There may be many instances of each of the relationships within a single semantic network. For example, a father of multiple children will have multiple "is a father" relationships. But there is only a single relationship name of "is a father of". "nsubj" is the number of subjects. A subject in the semantic network implemented according to the present invention corresponds to a node 102,104,106 in the semantic network of FIG. 1. Each subject is defined by the contents of a subject descriptor parcel (see Example 3). "nreln" is the total number of half relationships which exists in the network. A half relationship is a relationship between a first node and a second node. In FIG. 1, a half relationship 150 exists between node 114 and 118. The relationship is directional, which is indicated by the arrow head shown in FIG. 1. If node 118 has a similar relationship to node 114 as node 114 has to node 118, then there will be another half relationship joining node 118 to node 114, with the arrowhead shown in the opposite direction.

"pcat" is the prime category offset. The prime category is another term used for root node, so this is the offset in the semantic network structure where the information on the root node or subject can be found. The data at that memory location is interpreted in the same way as for any other subject.

Figure 3:
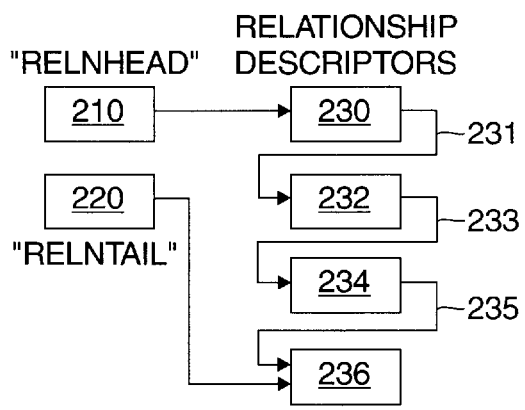
FIG. 3 is a diagram of a singly linked list of the relationship descriptors used in the semantic network of the present invention.

There may be many different relationship names within a single semantic network. The header includes an anchor pointer for a singly linked list of the relationship descriptors for the semantic network. This list is illustrated in FIG. 3. "relnhead" in Example 1 is a pointer 210 to the first entry 230 in a list of the relationship descriptors 230,232,234,236 defined for this database. Each relationship descriptor has a pointer to the next relationship descriptor. "relntail" is a pointer 220 to the last entry 236 in a list of the relationship descriptors defined for this database. Each relationship descriptor is defined in a parcel (described later), the parcel including a pointer ("next") to the next relationship descriptor in the list. In this way starting from the "relnhead" entry in the header, the linked list of relationship descriptors can be used to find a relationship descriptor quickly starting from the head of the list. In addition, the end of the list can quickly be located using "relntail" in order to insert an additional relationship descriptor. "relntree" is a pointer to a separate, superimposed binary tree which is used in a conventional manner to locate more quickly a relationship descriptor, given its name.

Figure 4:
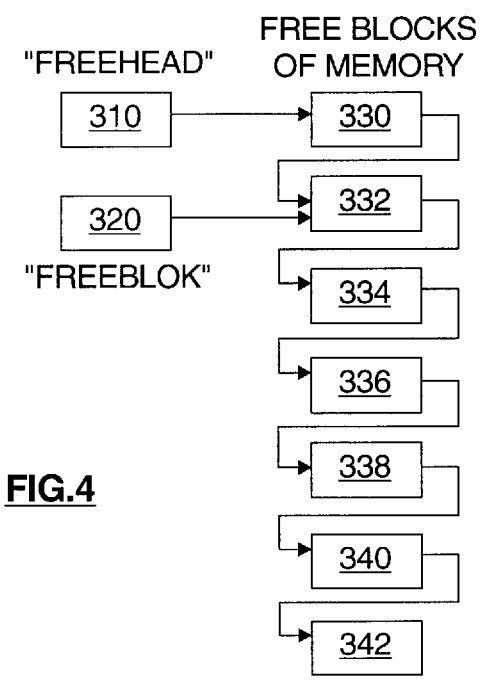
FIG. 4 is a diagram of a singly linked list of the free blocks in memory allocated for the semantic network of the present invention.

The header includes an anchor pointer for a singly linked list of the free blocks 330,332,334,336,338,340,342 in memory allocated for the semantic network. This list is illustrated in FIG. 4. "freehead" is a pointer 310 to the first free block 330 of memory which has not been allocated to either the header itself or to a parcel used to store details of relationships or subject. Each block of free memory has a pointer to the next free block of memory. "freeblok" is a pointer 320 to the largest block 332 of free memory available for allocation. This pointer is used so that, by allocating memory from the largest block available, then over time, there is a greater chance that small blocks of free memory will combine together. In addition, there is also the greatest chance that the data to be inserted in the block will be able to fit into the block of memory allocated. From the description of the function of "freeblok", it can be seen that pointing to the single largest block of memory at all times is not essential, it must point to one of the largest blocks most of the time in order to perform the desired function.

"ncomit" is the number of times that data has been committed. This indicates the number of times that data in the semantic network has been updated. In a simplest form of the network, without the ability for the network to be locked, this may be used to determine whether the semantic network has changed since a previous access. "lockid" is the id of the entity which has this semantic network locked. The entity is, for example, a process. The id may be any unique identifier identifying the entity which has the network locked. A lock is a mechanism by which use of a resource such as semantic network is restricted to the holder of the lock. The entity requests the lock for the semantic network. When the entity has been given the lock, the id of the entity is placed in the header of the semantic network. Once the entity receives that lock then no other entity may update the semantic network for which the lock was received. In a preferred embodiment, the entity obtains the lock for the entire semantic network and then locates the subject, relationship or relationship descriptor which it wishes to lock and checks a lock flag associated with that subject, relationship or relationship descriptor. If the lock flag does not indicate that the subject, relationship or relationship descriptor is already locked by another entity, then the entity locks the subject, relationship or relationship descriptor, and then releases the lock on the entire semantic network. When it wishes to release the lock on the subject, relationship or relationship descriptor, the process is repeated to release the lock.

Relationship Parcel

EXAMPLE 2

```
/* describe a relationship descriptor */
typedef struct {
    unsigned short    len;           /* parcel size          */
    unsigned int      next;          /* single linked list   */
    int               low_tree;      /* lower names          */
    int               high_tree;     /* higher names         */
    unsigned short    rel_num;       /* identifier           */
    char              name[1];       /* at least a NULL      */
} rel_name;
```

Example 2 shows the structure in memory of a relationship descriptor parcel for a semantic network implemented in accordance with the present invention.

"len" is the size, or length, of the parcel and is measured in bytes of memory. "next" is a pointer 231,233,235 to the next relationship descriptor parcel in the singly linked list shown in FIG. 3. "next" is used in conjunction with "relnhead" and "relntail", located in the semantic network header to form the list.

In a preferred embodiment, a binary tree, separate from the linked list of relationship parcels, keyed on the names of relationships, is superimposed on the network. This binary tree uses "low_tree" as a pointer to relationship descriptor parcels having names lower in position in the binary tree of relationship descriptor names. "high_tree" is a corresponding pointer to relationship descriptor parcels having names higher in position. Without the binary tree, the search for a relationship name must traverse the pointers in the singly linked list of relationships illustrated in FIG. 3. With the binary tree, the required descriptor is found more quickly. However, such a binary, or any other type of tree is not an essential part of the invention.

"rel_num" is an identifier or token used to identify this relationship. "rel_num" is used in the subject descriptor parcels to identify the type of a relationship. In this way, only a token need be stored in each of the subject descriptor parcels, the name of the relationship being capable of being found out by looking in the relationship descriptor parcel having that token in its "rel_num" entry. This makes the subject descriptor parcels much more efficient in terms of storage. "name[1]" is the name of the relationship stored as text and is, for example, "Has member" or "is employed by". The text is terminated by a null character.

Subject Parcel

EXAMPLE 3

```
/* describe the various types of subject - integer, float, string and
sequence */
typedef struct {
/* a standard subject header */
   /* a standard parcel header */
      unsigned short   len;      /* parcel size                         */
      unsigned int     next;     /* single linked list                  */
   /* end of the standard parcel header */
/* remainder of the standard subject header */
      unsigned char    sflags;   /* see description below               */
      unsigned char    nrel;     /* current number of relationships     */
/* the relationship description below is repeated for each of the "nrel"
relationships */
/* describe a relationship */
      unsigned char    rflags;   /* see description below               */
      unsigned short   rel_num;  /* ID of relationship                  */
      union {
         int           rnum;     /* parcel number of related subj       */
         int           rival;    /* integer - virtual subject           */
         float         rfval;    /* float                               */
         char          rcval[1]; /* string                              */
         char          rsval[1]; /* sequence                            */
      } s;
/* end of the relationship description */
/* end of the standard subject header */
/* describe the value */
      union {
         int           ival;     /* integer - virtual subject           */
         float         fval;
         char          cval[1]
         char          sval[1];
      } v;
/* end of the subject description
   } subj;
```

Example 3 shows the structure in memory of a subject descriptor parcel for a semantic network implemented in accordance with the present invention. The subject descriptor contains a subject header, having a parcel header and a subject header, which includes the number of relationships which this subject has. There follows details of each of the relationships this subject has. Finally, there is the data for the subject itself.

Subject header

"len" is the size, or length, of the parcel and is measured in bytes of memory. "next" is a pointer to the subject extension parcel, if any. Subject extension parcels are described below. If there is not a subject extension parcel, then "next" contains no relevant value.

"sflags" is a set of flags, bitmapped into a single byte. The flags used in subject parcels and associated with the subject information are defined as follows. The low order two bits are used to define whether the subject itself is an integer, a float, a string or a sequence. The next bit, "category" identifies whether this subject is a container subject for another subject. This is used to enforce the non-deletability of this subject until all of the subjects for which it acts as a container subject have been deleted. The next bit is not used. The next bit is a "lock" bit, which is used to identify the entity, if any, which has this subject locked. The next bit is a "delete" bit, which is used to indicate if this subject has been deleted. The high order two bits are unused. "nrel" is the number of relationships which this subject currently has.

Following the first part of the subject header is information identifying each of the "nreln" relationships which this subject currently has. The structure used to define one of these relationships is repeated "nreln" times so as to describe each of the relationships. A subject parcel is actually defined as having a fixed number of relationships, of which only "nrel" is the number which have valid data. In a preferred embodiment, this fixed number is 4. The remainder do not contain valid data, but are filled with valid data when a relationship is added to this subject parcel. "nrel" is updated to reflect the new number of relationships currently in this parcel. "nrel" is never greater than the fixed number of relationships for which this subject parcel has memory allocated. If further relationships are required for a subject parcels beyond the fixed number, then a subject extension parcel, described later, is used.

"rflags" is a set of flags, used in subject parcels and associated with relationship information. They differ in content from those described above for subject information. The low order two bits are used to define whether the related subject, that is the subject at the other end of the relationship, is an integer, a float, a string or a sequence. Three of the next four bits are defined in the same way as for "sflags", that is "category", "lock" and "delete". The bit which is not used, that is undefined, in "sflags" is defined in "rflags" as an "extend" bit. This indicates whether there is an extension parcel for a "virtual" subject. "Virtual" subjects are explained in the next paragraph and the effect of the "extend" bit, which is on how "rnum" should be interpreted, is discussed below together with "rnum".

The next bit is used to identify if the related subject is a real subject, that is one found in a separate subject parcel, or a "virtual subject", that is one in which the relationship is unidirectional and the related subject (its value) is contained within the relationship itself. An example of the use of a virtual subject is when the subject itself is a data file, and the related subject is the state "read-only" (R/O). The related subject value "R/O" will easily fit into the area of memory used to describe the relationship itself, and so the related subject need not actually be a separate subject with its value and relationships stored at a separate node. In place of the pointer to the related subject, the value itself of the subject is stored. This has the advantage of more efficient usage of storage. However, it does mean that it is not possible to traverse the relationship to the related subject, and from the related subject, to find all of the data files whose status is read-only. The highest order bit "negative" is used to identify if the relationship is a negative one, that is, it points in a direction towards this subject from a related subject, rather than away from it, towards a related subject. "rel_num" is the identifier or token used to identify this relationship. Only a token is stored in the subject descriptor parcels, the name of the relationship being capable of being found out by looking in the relationship descriptor parcel having that token in its "rel_num" entry.

An integer subject is just an integer number, the range of values depending on the number of bits used in the implementation of the programming language. In a preferred embodiment, 4 bytes are used to represent integer numbers. A range between $-2^{31}$ ($-2,147,483,648$) and $+2^{31}-1$ ($2,147,483,647$) results from the use of 4 bytes. A float subject is a floating point number, again the range of values depends on the number of bits, but is generally between about $10^{-38}$ and $10^{+38}$. String subjects are merely strings of characters terminated by a null character. Sequence subjects are also strings of characters, but without the terminating character, the length of the sequence being obtained by implication from the parcel length stored in the header, less the fixed length of the header itself.

For real subjects, that is subjects that are not virtual subjects, "rnum" is the parcel number of the related subject. What is stored here is a pointer in memory to the area of memory used to store the subject parcel at the other end of this relationship. For virtual subjects, the content of the related parcel is stored instead of the pointer to that parcel as "rival" if it is an integer subject, "rfval" if it is a float subject, "rcval" if it is a string subject and "rsval" if it is a sequence subject. In this way the content of the related subject can be accessed with having to find the subject at the other end of the relationship. However, the relationships which the related subject itself has, cannot be determined from the content stored at this end of the relationship, except of course, any relationships to this subject itself. In an exception to the above, if the subject is a virtual subject and the subject is a string (both of which can be determined from the value of "rflags" for this relationship) and the string is more than 4 bytes in length, including its null terminator, then what is stored at this location is a pointer to a relationship extension parcel, described later with reference to Example 5. A relationship extension parcel is merely used as an extension to the value of a virtual subject. The existence of a relationship extension parcel is known from the setting of the "extend" bit in "rflags" mentioned above. The setting of the "extend" bit is then used to determine whether "rnum" should be interpreted as a pointer to the relationship extension parcel, if the "extend" bit is true, or interpreted as the value, if it is false.

The content of this subject parcel itself is stored as "sival" if it is an integer subject, "sfval" if it is a float subject, "scval" if it is a string subject and "ssval" if it is a sequence subject. The union {..} v; is a standard compiler structure that means that only one of the terms within the parentheses is used.

Subject Extension Parcel

EXAMPLE 4

```
/* subjects have extension blocks */
typedef struct {
    unsigned short  len;         /* parcel size                       */
    unsigned int    next;        /* single linked list                */
    unsigned char   mxrel;       /* capacity of this block            */
    unsigned char   nrel;        /* current number of relationships   */
/* the relationship description below is repeated for each of the "nrel"
relationships */
/* describe a relationship */
    unsigned char   flags;       /* see relationship flag definition  */
    unsigned short  rel_num;     /* ID of relationship                */
    union {
        int         rnum;        /* parcel number of related subj     */
        int         rival;       /* integer - virtual subject         */
```

-continued

```
        float       rfval;       /* float                             */
        char        rcval[1];    /* string                            */
        char        rsval[1];    /* sequence                          */
    } s;
/* end of the relationship description */
} subj_ext;
```

Example 4 shows the structure in memory of a subject extension parcel for a semantic network implemented in accordance with the present invention. As mentioned above, a subject descriptor parcel only contains space for a fixed number of relationships. This limitation is because the subject descriptor parcel is created before the number of relationships is known and once created, it cannot be moved, since other subject descriptors refer to its position in their own relationships. This problem is overcome by the use of a subject extension parcel which contains only information on relationships. There is no subject data. The subject extension parcel is chained to the subject parcel to form a single linked list of indefinite length. The linked list starts from the "next" entry in the subject descriptor parcel, which points to the first subject extension parcel for that subject. The list continues with a pointer located in the "next" entry of the first subject extension parcel pointing to the second subject extension parcel. Further parcels can be chained to the list. The final parcel in the list contains no relevant value in the "next" entry.

"len" is the size, or length, of the parcel and is measured in bytes of memory. "next" is a pointer to the next subject extension parcel in the single linked list, if any. If there is not a further subject extension parcel, then "next" contains no relevant value.

"mxrel" contains the maximum number of relationships which can be stored in this subject extension block. The choice of this value is a trade-off between a large value, which is wasteful of storage, when there are many subject extension parcels with unused space for relationships and a small value, when there will be a need for many further extension parcels. In a preferred embodiment the maximum number of relationships stored is 10. "nrel" is the current number of relationships stored in this subject extension block. The relationship description, that is "flags", "rel_num","rnum", "rival", "rfval", "rcval" and "rsval" is the same as that described above that is used in a subject parcel and is repeated as many times as there are relationships stored in this subject extension parcel.

Relationship Extension Parcel

EXAMPLE 5

```
typedef struct {
    unsigned short  len;         /* parcel size                       */
    unsigned int    next;        /* actual length of data if this     */
                                 /* parcel contains a sequence        */
    union {
        int         vival;       /* integer value                     */
        float       vfval;
        char        vcval[1];
        char        vsval[1];
    } v;
} reln_ext;
```

Example 5 shows the structure in memory of a relationship extension parcel for a semantic network implemented in accordance with the present invention. Relationship extension parcels are used only for supporting virtual subjects having a length of more than the 4 bytes which cannot be fitted in if they are implemented as described above in a subject parcel. The actual value of the virtual subject is stored in this relationship extension parcel and a pointer placed in the subject parcel (in the location identified as "rnum") to point to this relationship extension parcel.

"len" is the size, or length, of the parcel and is measured in bytes of memory. "next" is only used where the virtual subject is a "sequence" type, when it is used to store the actual length of the sequence. Otherwise, "next" contains no relevant value.

The content of this virtual subject itself is stored as "ival" if it is an integer virtual subject, "fval" if it is a float virtual subject, "cval" if it is a string virtual subject and "sval" if it is a sequence virtual subject. The union {..} v; is a standard compiler structure that means that only one of the terms within the parentheses is used. The value stored in "rflags" location (lower order 2 bits) of the subject parcel to which the virtual subject is a related subject is used to identify the type of content of the virtual subject, and hence which of the definitions within the union statement should be used.

Application Programming Interface

An application programming interface is provided that allows the semantic network described above to be manipulated. The function of the interface is made available through a "C" interface. Calls are provided for setting up and maintaining the semantic network and for moving around and extracting information from the semantic network.

The calls for setting up and maintaining the semantic network include:

| | |
|---|---|
| db_create | Create the semantic network - initialises the allocated area of memory into parcels and creates a root node. |
| db_delete | Delete the semantic network. |
| db_reset | Remove all the subjects and all the relationships. |
| db_create_relation | Create a relationship descriptor - given a name for the relationship, it creates a relationship descriptor parcel and allocates a token to that relationship. |
| db_new_integer,<br>db_new_float,<br>db_new_string,<br>db_new_sequence, | Create a new subject. There are separate calls for creating each of the four types of subject presently defined in the embodiment of the semantic network described above. Given a container subject, the type of relationship to that container subject and a value for the subject, a subject descriptor parcel is created. |
| db_chg_integer,<br>db_chg_float,<br>db_chg_string,<br>db_chg_sequence, | Change a subject value. There are separate calls for changing the value of each of the four types of subject presently defined in the embodiment of the semantic network described above. Given the subject name and the updated value, the subject descriptor parcel is updated with the changed value. |
| db_chg_integer,<br>db_chg_rel_float,<br>db_chg_rel_string,<br>db_chg_rel_sequence, | Change a related subject value. There are separate calls for changing the value of each of the four types of related subject presently defined in the embodiment of the semantic network described above. |
| db_delete_subject | Delete a subject. If the subject is a container subject, that is the CATEGORY bit in the flags of any of the relationships is set, then this must fail in order to preserve the acyclic containment graph. All relationships from this subject are deleted, with the exception of those used for containment. |
| db_virtual_integer,<br>db_virtual_float,<br>db_virtual_string,<br>db_virtual_sequence, | Create a new virtual subject. There are separate calls for creating each of the four types of virtual subject presently defined in the embodiment of the semantic network described |

-continued

| | |
|---|---|
| | above. Given the real subject where the virtual subject is to be actually located, the type of relationship from the real subject to the virtual subject and the value of the virtual subject, a relationship is added to the subject parcel. |
| db_add_reln | Add a new relationship. Given the subject to which a relationship is to be added to, the type of relationship from that subject to the related subject and the name of the related subject, a relationship is added to the subject parcel. |
| db_delete_reln | Delete a relationship. If the relation is marked as a container relationship, that is the CATEGORY bit in the flags is set, then this must fail in order to preserve the acyclic containment graph. The related subject for which this relationship is acting as a container relationship must be deleted first. |

I claim:
1. A database arranged as a semantic network in which:
data is stored in data storage areas at nodes of the network, there being a root node from which all other nodes depend in a branched structure;
data stored in data storage areas at a first node includes:
a value of a subject of the first node; and
relationship information about one or more relationships from the first node to one or more second related nodes, said relationship information including a token identify a relationship type and second nodes, not being linked in the branched structure to said first node wherein the token is a shortened representation of a corresponding relationship name; and
the database comprising information relating the tokens to the corresponding relationship names.

2. A database as claimed in claim 1 in which said relationship information includes a flag indicating a type of a related subject corresponding to said related node.

3. A database as claimed in claim 2 in which said relationship information includes a flag indicating that the relationship points in a direction towards this node from a related node.

4. A database as claimed in claim 1 in which said relationship information relates to a virtual node and said relationship information itself includes the data which would have been in the virtual node.

5. A database as claimed in claim 4 in which said relationship information includes a flag indicating a type of a related subject corresponding to said related node.

6. A database as claimed in claim 5 in which the data for said virtual node is stored at a location pointed to by the relationship information, the location not being part of the branched structure.

7. A database as claimed in claim 5 in which said relationship information includes a flag indicating that the relationship points in a direction towards this node from a related node.

8. A database as claimed in claim 7 in which branches in said branched structure comprise a relationship, whose flag indicates that the relationship is part of the branched structure.

9. A database as claimed in claim 8 in which said relationship information includes a flag indicating that the relationship points in a direction towards this node from a related node.

10. A computer system comprising a memory, a display device, an input device and a database arranged as a semantic networks, in which:

data is stored in data storage areas at nodes of the network, there being a root node from which all other nodes depend in a branched structure;

data stored in data storage areas at a first node includes:
   a value of a subject of the first node; and
   relationship information about one or more relationships from the first node to one or more second related nodes, said relationship information including a token identify a relationship type and second nodes not being linked in the branched structure to said first node, wherein the token is a shortened representation of a corresponding relationship name; and the database comprising information relating the tokens to the corresponding relationship names.

11. A computer system as claimed in claim 10 in which said relationship information includes a flag indicating a type of a related subject corresponding to said related node.

12. A computer system as claimed in claim 11 in which said relationship information includes a flag indicating that the relationship points in a direction towards this node from a related node.

13. A computer system as claimed in claim 10 in which said relationship information relates to a virtual node and said relationship information itself includes the data which would have been in the virtual node.

14. A computer system as claimed in claim 13 in which said relationship information includes a flag indicating a type of a related subject corresponding to said related node.

15. A computer system as claimed in claim 14 in which the data for said virtual node is stored at a location pointed to by the relationship information, the location not being part of the branched structure.

16. A computer system as claimed in claim 14 in which said relationship information includes a flag indicating that the relationship points in a direction towards this node from a related node.

17. A computer system as claimed in claim 16 in which branches in said branched structure comprise a relationship, whose flag indicates that the relationship is part of the branched structure.

18. A computer system as claimed in claim 17 in which said relationship information includes a flag indicating that the relationship points in a direction towards this node from a related node.

* * * * *